(12) United States Patent
Yeh et al.

(10) Patent No.: US 8,607,435 B2
(45) Date of Patent: Dec. 17, 2013

(54) TOOL HOLDER

(75) Inventors: Chi-Hsien Yeh, Tu-Cheng (TW); Chin-Tsan Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/163,865

(22) Filed: Jun. 20, 2011

(65) Prior Publication Data
US 2012/0082520 A1  Apr. 5, 2012

(30) Foreign Application Priority Data

Sep. 30, 2010  (CN) .......................... 2010 1 0298195

(51) Int. Cl.
*B23P 23/00* (2006.01)
*B26D 1/12* (2006.01)

(52) U.S. Cl.
USPC .................................. 29/566; 407/31; 279/8

(58) Field of Classification Search
USPC ......... 407/30–32; 279/8; 29/50, 566; 408/27; 451/461, 69–71
See application file for complete search history.

(56) References Cited

U.S. PATENT DOCUMENTS

| | | | | |
|---|---|---|---|---|
| 5,520,569 A | * | 5/1996 | Endoh | 451/5 |
| 6,557,445 B1 | * | 5/2003 | Ishikawa | 82/158 |
| 6,926,593 B1 | * | 8/2005 | Carroll et al. | 451/65 |
| 2003/0228199 A1 | * | 12/2003 | Matsumoto et al. | 409/141 |
| 2008/0080942 A1 | * | 4/2008 | Chen | 409/141 |

FOREIGN PATENT DOCUMENTS

JP  2002-239827  *  8/2002  ............... B23C 5/00

* cited by examiner

*Primary Examiner* — Andrea Wellington
*Assistant Examiner* — Ryan Rufo
(74) *Attorney, Agent, or Firm* — Altis Law Group, Inc.

(57) ABSTRACT

A tool holder, used for holding a milling cutter and a grinding wheel, includes a tool bar, a tool base, a flange, a mounting shaft, and a fixing ring. The flange is formed on an end of the tool bar. The tool base is used for mounting the milling cutter. The ends of the mounting shaft are connected to the flange and the tool base respectively. The grinding wheel is mounted on the mounting shaft. The fixing ring is used for fixing the grinding wheel to the mounting shaft.

18 Claims, 3 Drawing Sheets

TOOL HOLDER

BACKGROUND

1. Technical Field

The present disclosure relates generally to tool holders and, more particularly, to a tool holder for holding a milling cutter and a grinding wheel together.

2. Description of Related Art

During the machining process of a workpiece, a milling cutter is usually employed to cut the workpiece, and then a grinding wheel is employed to grind an outer surface of the workpiece, and thus decreasing the surface roughness of the workpiece. As a result, the tool holder should be exchanged to adapt for the milling cutter during milling and exchanged again for the grinding process. However, continuous exchanging of the tool holder is inefficient, and affects the machining precision.

Therefore, there is room for improvement within the art.

BRIEF DESCRIPTION OF THE DRAWINGS

The elements in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
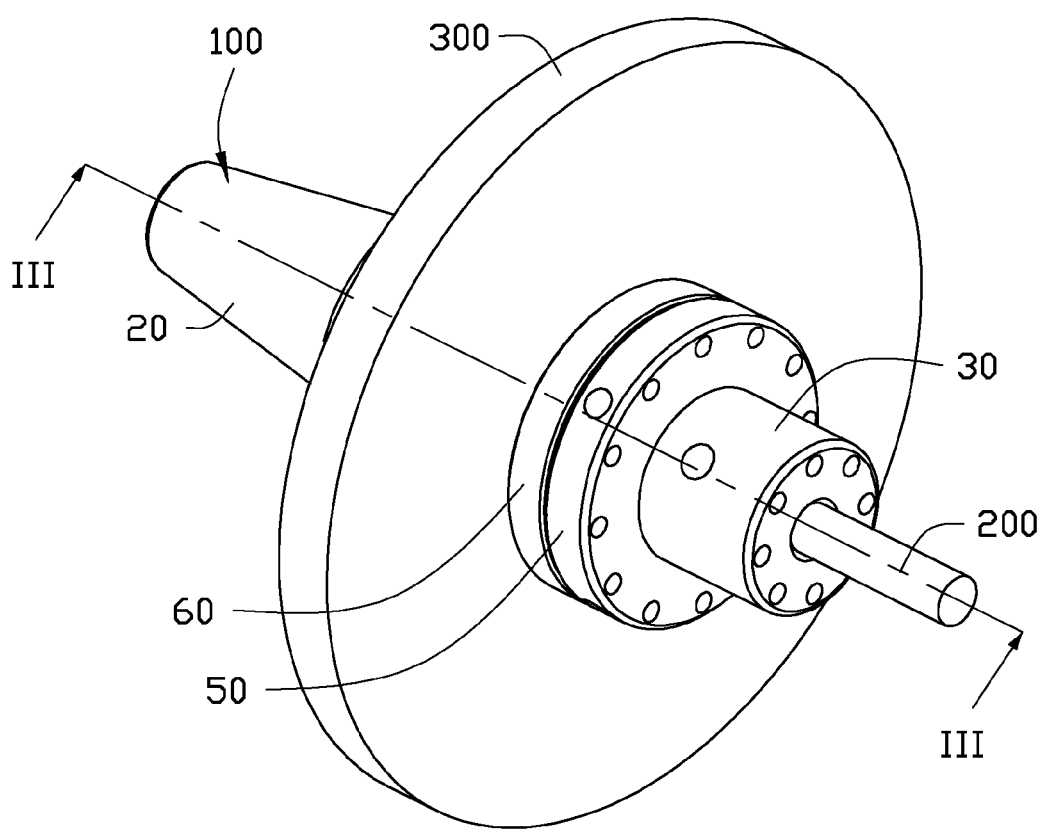
FIG. 1 is an isometric view of an embodiment of a tool holder with a milling cutter and a grinding wheel.
Figure 2:
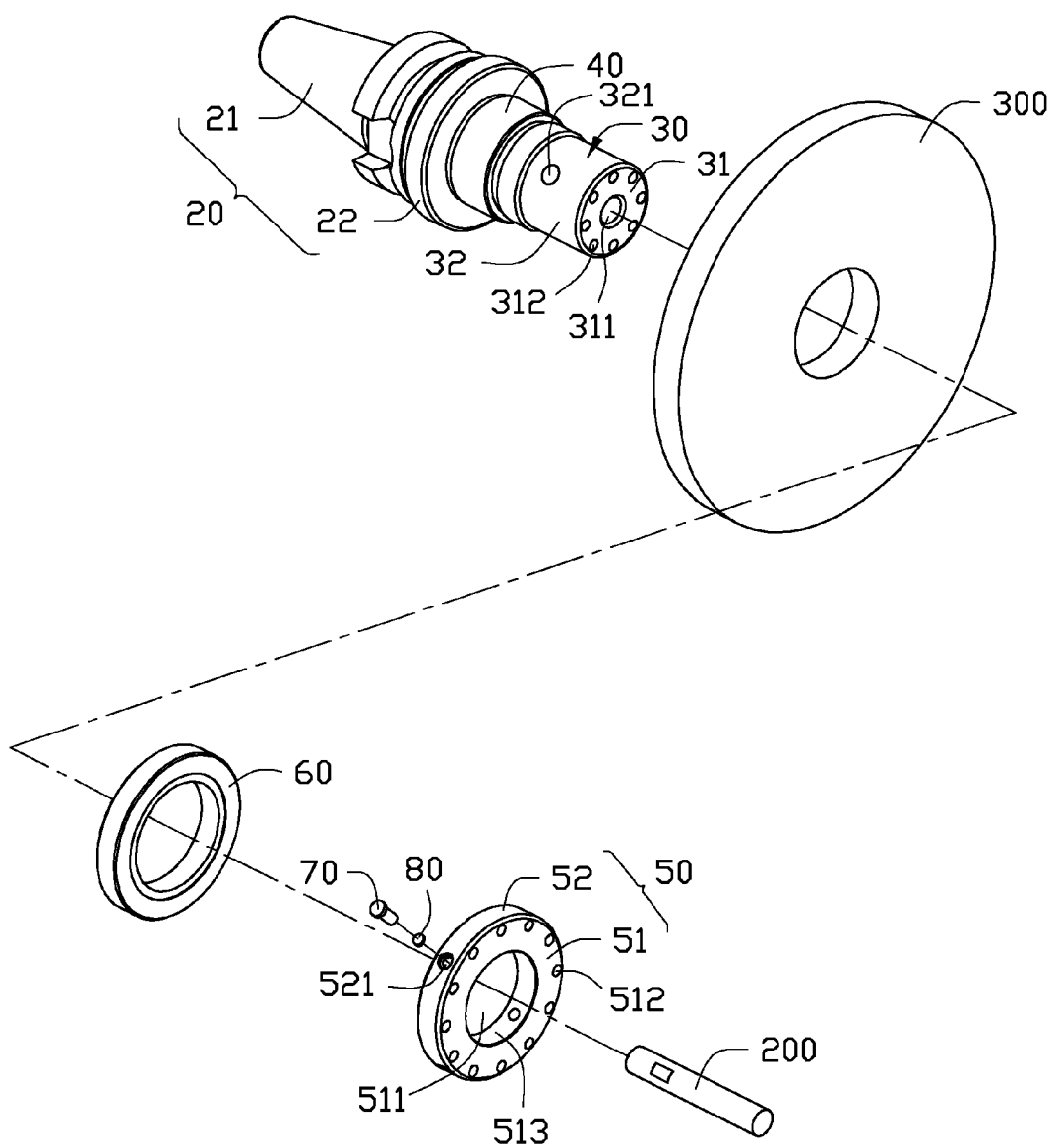
FIG. 2 is an exploded, isometric view of the tool holder with the milling cutter and the grinding wheel of FIG. 1.

Referring to FIGS. 1 and 2, an embodiment of a tool holder 100, used for holding a milling cutter 200 and a grinding wheel 300 together, includes a tool bar 20, a flange 22, a tool base 30, a mounting shaft 40, a fixing ring 50, and a fixing washer 60. The tool bar 20 and the tool base 30 are connected to opposite ends of the mounting shaft 40 respectively. The flange 22 is formed on an end of the tool bar 20. The fixing ring 50 and the fixing washer 60 are sleeved on the mounting shaft 40, and contact with each other. The fixing ring 50 is adjacent to the tool base 30.

Figure 3:
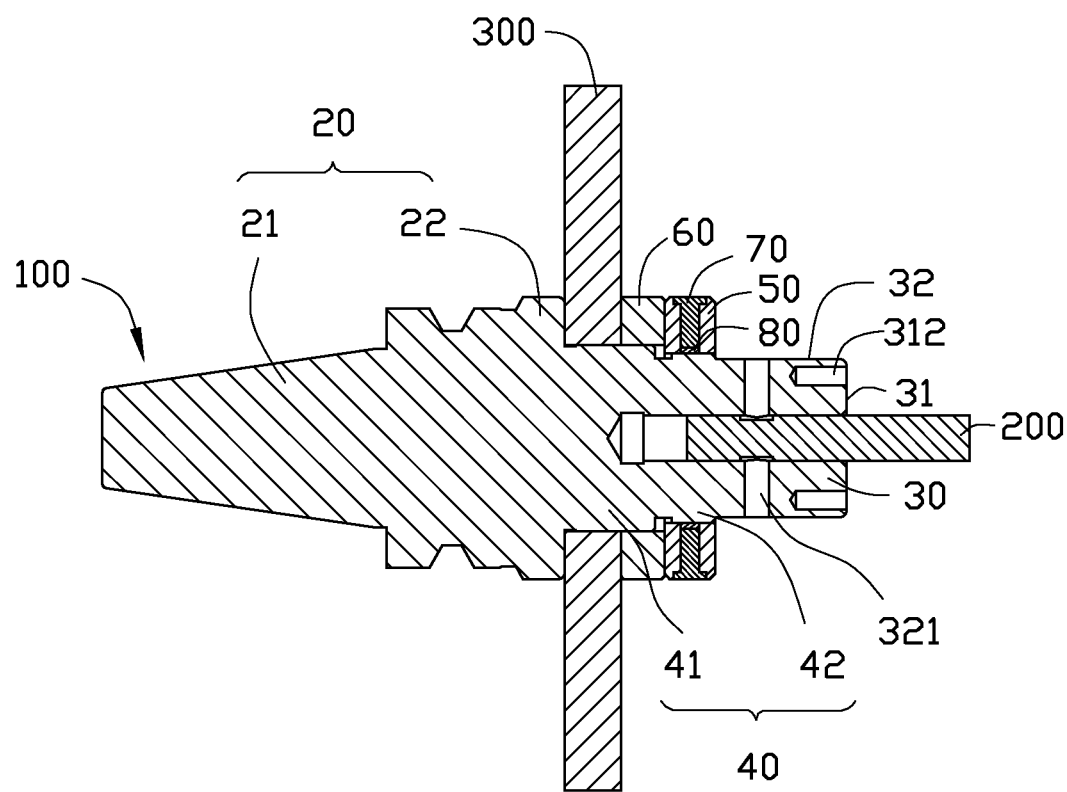
FIG. 3 is a cross-section of FIG. 1, taken along the line III-III.

Referring also to FIG. 3, the tool bar 20 includes a conical portion 21. The conical portion 21 is connected to the main shaft of the machine (not shown), and thus the tool holder 100 may rotate about the main shaft. The flange 22 is formed on an end of the conical portion 21, and is adjacent to the mounting shaft 40.

The tool base 30 is substantially cylindrical, and includes an end surface 31 and a side surface 32. The end surface 31 is opposite to the mounting shaft 40. A shaft hole 311 is defined in a center of the end surface 31. A plurality of first adapting holes 312 can be defined in periphery of the end surface 31, and evenly arranged apart from each other. Two fixing holes 321 are symmetrically defined in the side surface 32, and communicate with the shaft hole 311. The milling cutter 200 is inserted into the shaft hole 311, and is securely placed on the tool base 30 via two screws (not shown) through the fixing holes 321. In the illustrated embodiment, eight first adapting holes 312 are defined. The first adapting hole 312 can also be defined in the side surface 32.

The tool holder 100 further includes a plurality of adapting screws (not shown) according to the first adapting holes 312, to maintain dynamic balance of the tool holder 100.

The mounting shaft 40 is substantially cylindrical, and includes a fixing portion 41 and a threaded portion 42. The fixing portion 41 is adjacent to the flange 22 of the tool bar 20. A diameter of the fixing portion 41 is greater than that of the threaded portion 42, to facilitate mounting the grinding wheel 300. The grinding wheel 300 is sleeved on the fixing portion 41, and is adjacent to the flange 22.

The fixing ring 50 includes an end surface 51 and a side surface 52 connected to the end surface 51. A center hole 511 is defined in the center of the end surface 51. An inner surface 513 of the center hole 511 is threaded, and is engaged with the threaded portion 42 of the mounting shaft 40, such that the grinding wheel 300 resists the flange 22, and is fixed on the tool holder 100. A plurality of second adapting holes 512 can be defined in the periphery of the end surface 51, and evenly arranged apart from each other. A distance from each second adapting hole 512 to the axis of the tool holder 100 is greater than that from each first adapting hole 312 to the axis of the tool holder 100. To maintain the dynamic balance of the tool holder 100, first, the adapting screws engaged in the second adapting holes 512 are employed to preliminarily maintain the dynamic balance. The adapting screws engaged in the first adapting holes 312 are employed to accurately maintain the dynamic balance, namely to fine tune the balance. As a result, it is faster to maintain the dynamic balance of the tool holder 100, and the machining precision can be improved. A plurality of engaging holes 521 are defined in the side surface 52, evenly arranged apart from each other, and communicate with the center hole 511.

In the illustrated embodiment, twelve second adapting holes 512 are defined in the end surface 51, and three engaging holes 521 are defined in the side surface 52.

The fixing washer 60 can be ring-shaped. The fixing washer 60 is sleeved on the mounting shaft 40, and sandwiched between the fixing ring 50 and the grinding wheel 300. A thickness of the fixing washer 60 can be changed according to the thickness of the grinding wheel 300, such that the tool holder 100 adapts to different grinding wheels with different thicknesses.

The tool holder 100 further includes a plurality of engaging screws 70 engaged with the engaging holes 521, to further fix the grinding wheel 300 and the fixing ring 50 together.

The tool holder 100 further includes a plurality of engaging washers 80. Each engaging washer 80 is placed in each engaging hole 521. The engaging washer 80 is made of metal material with relatively low hardness, such as copper or copper alloy. The engaging washer 80 can keep the threaded portion 42 of the mounting shaft 40 from being damaged, when fixing the fixing ring 50 via the engaging screws 70.

Because the tool holder 100 can hold the milling cutter 200 and the grinding wheel 300 together, after milling, the work piece can be ground when needed, without having to exchange the tools. As a result, the time of exchanging tool holders is eliminated, and the work efficiency and the machining precision are improved.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A tool holder used for holding a milling cutter and a grinding wheel together, the tool holder comprising:
   a tool bar;

a flange formed on an end of the tool bar;

a tool base for positioning the milling cutter;

a mounting shaft comprising a threaded portion, the flange and the tool base connected to opposite ends of the mounting shaft, the mounting shaft being configured for mounting the grinding wheel thereon; and a fixing ring defining a center hole in a center of an end surface thereof, wherein an inner surface of the center hole is threaded and engaged with the threaded portion for fixing the grinding wheel to the mounting shaft.

2. The tool holder of claim 1, wherein the tool holder further comprises a fixing washer sleeved on the mounting shaft and sandwiched between the fixing ring and the grinding wheel.

3. The tool holder of claim 1, wherein a plurality of engaging holes are defined in a side surface of the fixing ring, and communicate with the center hole.

4. The tool holder of claim 3, wherein the tool holder further comprises a plurality of engaging washers positioned in the engaging holes.

5. The tool holder of claim 4, wherein the engaging washer is made of copper or copper alloy.

6. The tool holder of claim 1, wherein at least one first adapting holes are defined in an end surface or a side surface of the tool base, and the tool holder further comprises at least one adapting screws engaged with the at least one first adapting holes to maintain the dynamic balance of the tool holder.

7. The tool holder of claim 6, wherein at least one second adapting holes are further defined in the end surface of the fixing ring, and the tool holder further comprises at least one adapting screws engaged with the second adapting holes to further maintain the dynamic balance of the tool holder.

8. The tool holder of claim 7, wherein a distance from the at least one second adapting hole to the tool holder axis is greater than a distance from the at least one first adapting hole to the tool holder axis.

9. The tool holder of claim 1, wherein the mounting shaft further comprises a fixing portion, and the grinding wheel is sleeved on the fixing portion adjacent to the flange.

10. A tool holder used for holding a milling cutter and a grinding wheel together, the tool holder comprising:

a tool bar;

a flange formed on an end of the tool bar;

a tool base for positioning the milling cutter, wherein at least one first adapting hole is defined in an end surface or a side surface of the tool base to maintain dynamic balance of the tool holder;

a mounting shaft, wherein the flange and the tool base are connected to opposite ends of the mounting shaft, and the grinding wheel is mounted on the mounting shaft;

a fixing ring fixing the grinding wheel to the mounting shaft; and a fixing washer sleeved on the mounting shaft and sandwiched between the fixing ring and the grinding wheel.

11. The tool holder of claim 10, wherein the mounting shaft comprises a threaded portion, a center hole is defined in an end surface center of the fixing ring, and the inner surface of the center hole is threaded and engaged with the threaded portion.

12. The tool holder of claim 11, wherein a plurality of engaging holes are defined in a side surface of the fixing ring, and communicate with the center hole.

13. The tool holder of claim 12, wherein the tool holder further comprises a plurality of engaging washers positioned in the engaging holes.

14. The tool holder of claim 13, wherein the engaging washer is made of copper or copper alloy.

15. The tool holder of claim 10, wherein the tool holder further comprises at least one adapting screws engaged with the at least one first adapting holes to maintain dynamic balance of the tool holder.

16. The tool holder of claim 15, wherein at least one second adapting holes are defined in the end surface of the fixing ring, and the tool holder further comprises at least one adapting screws engaged with the second adapting holes to further maintain the dynamic balance of the tool holder.

17. The tool holder of claim 16, wherein a distance from the at least one second adapting hole to the tool holder axis is greater than a distance from the at least one first adapting hole to the tool holder axis.

18. The tool holder of claim 10, wherein the mounting shaft further comprises a fixing portion, and the grinding wheel is sleeved on the fixing portion adjacent to the flange.

* * * * *